United States Patent [19]
Harvey

[11] 3,970,102
[45] July 20, 1976

[54] PIPE-FOLLOWING IRRIGATION MACHINE
[75] Inventor: Vernon Bryan William Harvey, Ringwood, England
[73] Assignee: Wright Rain Limited, Ringwood, England
[22] Filed: Feb. 25, 1975
[21] Appl. No.: 552,743

[30] Foreign Application Priority Data
Feb. 28, 1974 United Kingdom............... 9049/74
June 28, 1974 United Kingdom............. 28702/74
June 28, 1974 United Kingdom............. 28703/74

[52] U.S. Cl................................ 137/344; 239/186; 239/183
[51] Int. Cl.² ......................................... E01H 3/02
[58] Field of Search ............. 137/344; 239/186, 183

[56] References Cited
UNITED STATES PATENTS
| | | | |
|---|---|---|---|
| 3,444,941 | 5/1969 | Purtell | 137/344 X |
| 3,575,200 | 4/1971 | Imeson | 137/344 |
| 3,710,818 | 1/1973 | Imeson | 137/344 |

Primary Examiner—Henry T. Klinksiek
Attorney, Agent, or Firm—Gifford, Chandler & Sheridan

[57] ABSTRACT

An irrigation machine having traction wheels which run along the top of a pipe having self-closing hydrants spaced apart in the length of the pipe. The machine is guided to follow the course of the pipe. When the machine reaches a hydrant, the machine stops and a vertically-movable riser pipe in the form of a probe and connected to a water gun or other water distribution device automatically descends to open the hydrant valve and thus admit water to the riser pipe and to the water gun. The machine is fitted with a device which shifts the machine longitudinally of the hydrant as the riser pipe is lowered towards the hydrant so that when the probe end of the riser pipe enters the hydrant, the probe end will be in precise vertical alignment with the hydrant. After a predetermined time the riser pipe is raised, the hydrant valve closes and the machine travels along the pipe to the next hydrant.

8 Claims, 9 Drawing Figures

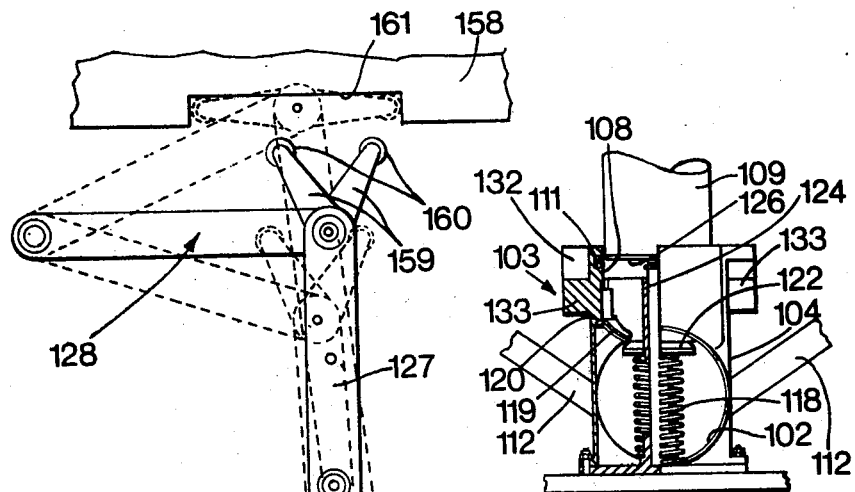
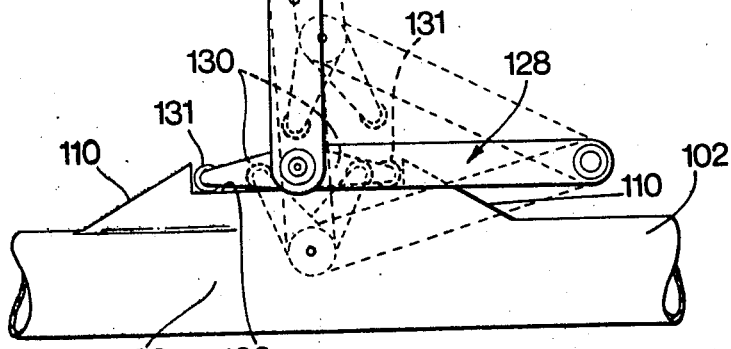
FIG. 9
FIG. 7

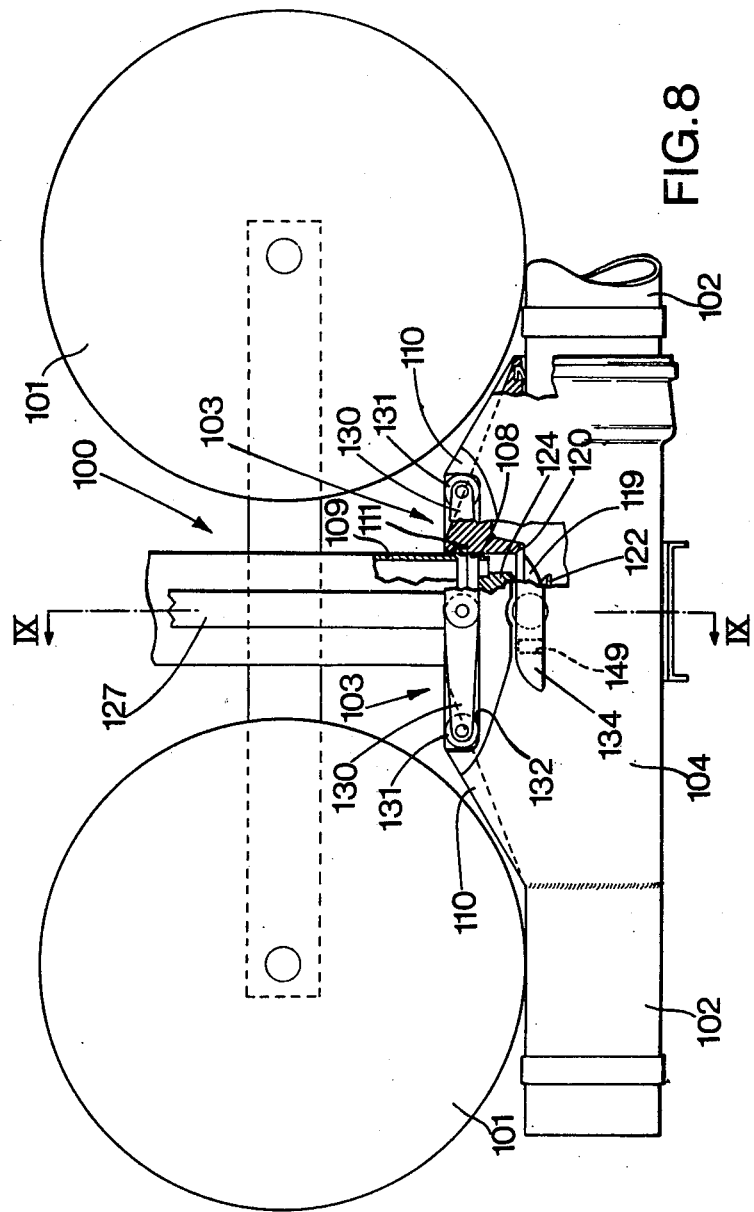

PIPE-FOLLOWING IRRIGATION MACHINE

BACKGROUND OF THE INVENTION

1. Field of the Invention

The invention relates to an irrigation machine and particularly relates to an irrigation machine of the type which is guided to follow the course of a water supply pipe having self-closing hydrants spaced apart along the length of the pipe and by which a water distribution device such as a water gun, sprinkler or a fixed or a rotatable boom carrying sprinklers is arranged to be coupled and to be supplied with water by the hydrants in succession, thereby progressively to irrigate an area of ground as the machine travels along the course of the pipe.

2. Description of the Prior Art

Some irrigation machines of the foregoing type are guided electrically and others employ guiding wheels arranged to engage the pipe itself. Whichever method of guidance is employed it is desirable to bring the machine to a stop in a precise position to enable a connection to be made to the hydrant. An object of the invention is to provide a machine which is automatically adjusted to a precise position with respect to a hydrant to which it is to be coupled.

Hitherto irrigation machines of the foregoing type having either method of guidance have suffered from the disadvantage that the main load-carrying traction wheels of the machine run on the ground being irrigated. This factor has limited the size of the machine due to the considerable weight and thrust when a machine of this type is irrigating or requires the construction of special tracks for the traction wheels. A further object of the invention is to provide an irrigation machine of the foregoing type in which this disadvantage is avoided.

Yet another object of the invention is to provide pipe-following and automatic hydrant-engaging means for converting an irrigation machine of a type which is not automatically movable between irrigating positions into a pipe-following and hydrant-engaging machine. Another object of the invention is to provide a complete irrigating machine having pipe-following and hydrant-engaging means which is automatically adjustable relatively to the remainder of the machine when a hydrant is being engaged to enable a coupling to the hydrant to be effected, thereby enabling pipe-following and hydrant-engaging means to be used in a large and heavy irrigation machine which could not otherwise be precisely positioned with respect to a hydrant.

SUMMARY OF THE PRESENT INVENTION

According to the invention, an irrigation machine comprises a vehicle including guiding means by which the machine is to follow the course of a water supply pipe having a plurality of self-closing hydrants spaced apart along the pipe, a vertically-movable riser pipe carried by the vehicle and arranged to be coupled at its lower end to the hydrants in succession and when so coupled to a hydrant to open a self-closing valve in the hydrant, means to propel the vehicle along the course of the pipe from one hydrant to another and to stop the vehicle with the riser pipe located above a hydrant, means to shift the vehicle to bring the riser pipe into precise alignment with the hydrant as the riser pipe is being lowered into engagement with the hydrant, means for holding the vehicle in said position of precise alignment while the riser pipe is coupled to the hydrant and means for automatically raising and lowering the riser pipe when the vehicle has been stopped at a hydrant.

Conveniently the means for shifting the vehicle into said position of precise alignment comprises a pair of freely hinged links of which the hinge is arranged to be moved downwardly as the riser pipe is lowered towards the hydrant and having their free ends arranged to run in a fixed track, the length of the track being substantially the same as the combined length of the hinged links when fully diverged, whereby as the riser pipe is lowered the free ends of the hinged links will engage the respective ends of the fixed track and thereby shift the hinge pin and thus shift the vehicle to bring the riser pipe into precise vertical alignment with the mouth of the hydrant.

The means for holding the vehicle in said precise position conveniently comprises a member carried by the vehicle and movable during said shifting of the vehicle into said position of precise alignment relatively to a co-operating fixed surface positioned above said member, whereby when water is discharged through the hydrant to the riser pipe an upward thrust of water on the riser pipe will engage said member with said fixed surface.

Where the machine is to be guided by its engagement with the water supply pipe itself, the vehicle may have at least one traction wheel or equivalent means mounted to travel on the upper surface of the pipe and guide means engageable with the side surfaces of the pipe to maintain the traction wheel or wheels or equivalent means in engagement with the upper surface of the pipe, the means to shift the vehicle to bring the riser pipe into precise alignment with the hydrant being directed to effect said shifting in directions longitudinally of the pipe.

The guide means may conveniently comprise at least one pair of sideways-locating wheels or rollers engageable with the side surfaces of the pipe to maintain the traction wheel or wheels engaging the upper surface of the pipe in substantial lateral alignment with the longitudinal centre-line of the pipe.

Each hydrant conveniently includes an upwardly-facing, self-closing valve member which is arranged to be depressed, by the downward movement of the riser pipe, from a closed to an open position. The valve member of each hydrant may be arranged with its axis of movement extending in an upright plane containing the longitudinal centre-line of the pipe, in which case the traction wheel or wheels would pass over the upper surface of each hydrant immediately above the valve member therein as the vehicle travels along the pipe and so the upper surface of the hydrant would probably be raised above the upper surface of the pipe thereby producing a protuberance to be encountered by the traction wheel or wheels. Alternatively, the valve member of each hydrant may be offset laterally with respect to the longitudinal centre-line of the pipe, thereby enabling the portion of the upper surface of the hydrant in longitudinal alignment with the upper surface of the pipe to be shaped to provide a substantially uninterrupted path for the traction wheel or wheels along the upper surface of the pipe or a smaller protuberance to be encountered by the traction wheel or wheels.

The invention may also include the combination of an irrigation machine as set out in any one of the immediately preceding three paragraphs with a water supply pipe along which the vehicle will travel, the water supply pipe including a plurality of self-closing hydrants spaced apart in the length of the pipe and with which the machine will be engaged in succession.

The means to propel the vehicle along the pipe may be any convenient driving means carried by the vehicle. For example the driving means may be pneumatically, hydraulically or electrically-operable or the traction wheels may be driven by an internal combustion engine. The riser pipe may be arranged to be raised or lowered by a pneumatic, hydraulic or electrically-operable means or by an internal combustion engine.

The vehicle may carry water distribution means and thus the vehicle would constitute a complete irrigation machine. Alternatively the vehicle may be employed as a pipe-following and hydrant-engaging means to be coupled to a mobile irrigation machine carrying water distribution means.

BRIEF DESCRIPTION OF THE DRAWING

Two irrigation machines in accordance with the present invention are now described, by way of example, with reference to the accompanying drawings, in which:

FIG. 7 is a part of the pipe-following and hydrant-engaging means shown in FIG. 6 drawn to a larger scale;

FIG. 8 is a side view to a larger scale, and shown partly in section, of part of the machine shown in FIG. 6; and FIG. 9 is a half section on the line IX—IX in FIG. 8 and half end view of a hydrant with which the second machine is used.

Figure 1:
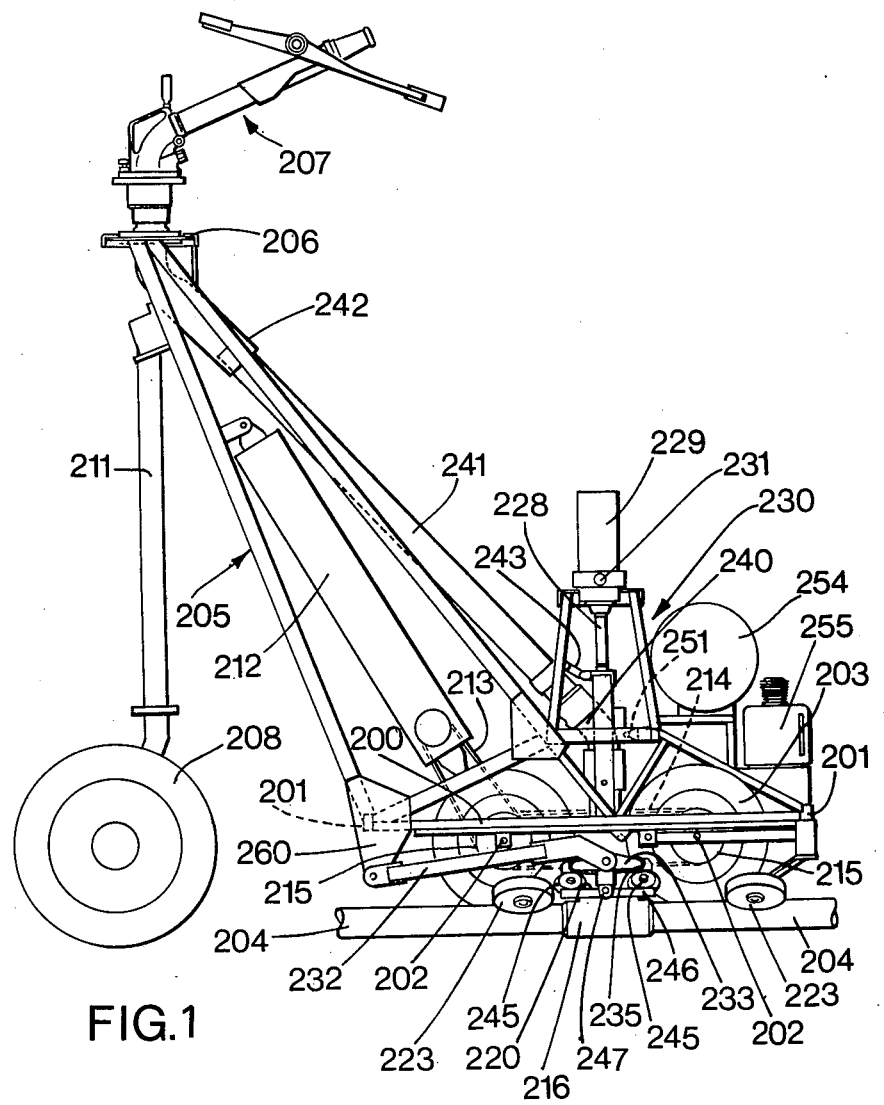
FIG. 1 is a side elevation of the first machine aligned over a hydrant in a water supply pipe.
Figure 2:
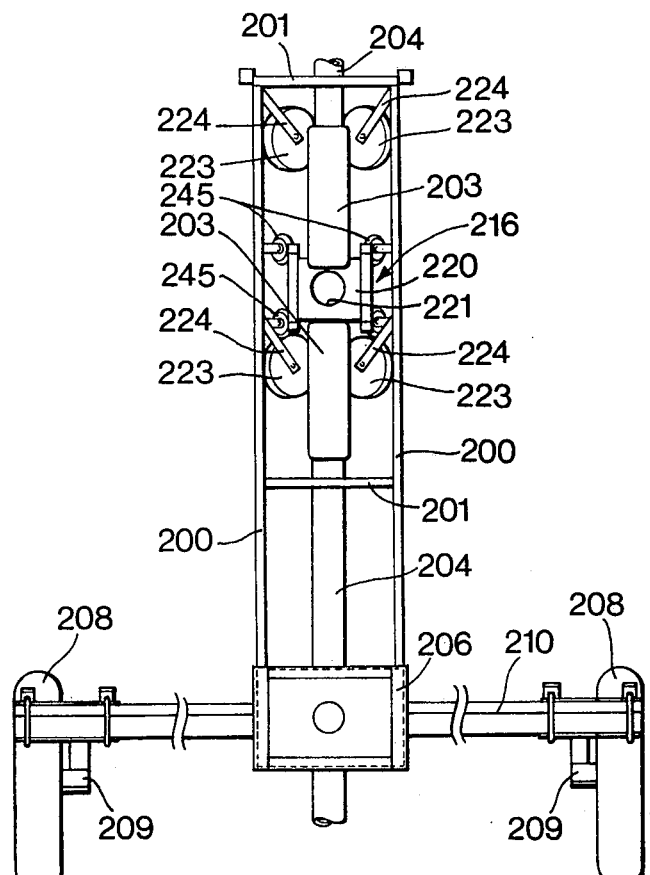
FIG. 2 is a plan view of the machine shown in FIG. 1.

Referring initially to FIGS. 1 and 2, the irrigation machine comprises a main frame including a pair of parallel longitudinal members 200 and a pair of transverse end members 201, the members 200 and 201 together forming a rectangle when viewed in plan. The longitudinal members 200 support a pair of transverse axles indicated at 202 each carrying a wheel 203. The wheels 203 are positioned in tandem and in use are arranged to run on top of a pipe 204 laid along the ground to be irrigated. The wheels 203 are the traction wheels and support the main frame and the whole machine. The main frame carries an upwardly and rearwardly extending frame 205 supporting a platform 206 on which a water gun 207 or other water discharge device, for example a boom carrying sprinklers, is mounted. The platform 206 and the whole machine is also supported on a pair of widely-spaced outrigged trailing wheels 208 which are mounted on castoring axles 209 carried on a transverse beam 210 carried by a strut 211, attached at its upper end to the frame 205. The frame 205 also carries a double-acting pneumatic ram 212 arranged to drive one of the wheels 203 through a pair of driving sprockets and an endless chain 213. The other wheel 203 is similarly driven from the said one wheel by an endless chain 214 and sprockets 215. Thus reciprocation of the pneumatic ram 211 drives the machine by means of the wheels 203 longitudinally of the pipe in a direction from left to right as viewed in FIG. 1.

Figure 4:
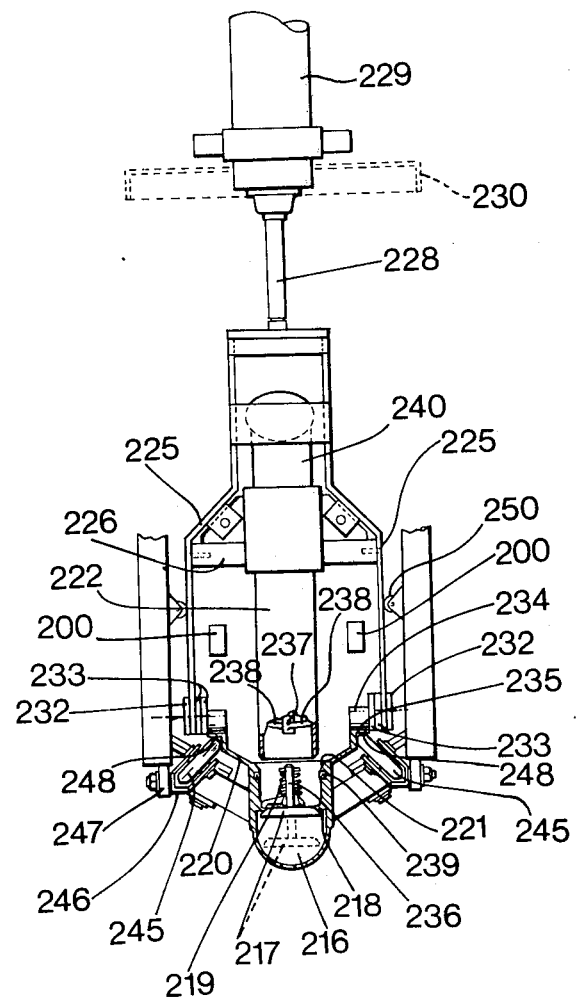
FIG. 4 is a vertical section on the line IV—IV in FIG. 3.

The pipe 204 comprises sections coupled together by hydrants 216 each containing an upwardly-facing valve member 217 which is, except when depressed, held upwardly in a closed position against a seat 218 by a spring 219 and by water pressure in the pipe 204 and hydrant 216 (see FIG. 4). The body of the hydrant 216 is cylindrical and is of slightly larger diameter than the pipe sections and is formed with an upper platform 220 having a socket 221 therein to receive the riser pipe or probe 222 by which the valve member 217 is opened and the machine is coupled to the hydrant. The probe 222 is described in greater detail hereinafter. The wheels 203 are able to ride one after the other over the hydrants as the machine is driven along the pipe. A ramp (not shown) may be provided at the approach end or at both ends of each hydrant to assist the wheels 203 to ride over the hydrants.

The machine is guided along the pipe by two pairs of longitudinally spaced side-guidance wheels 223 supported by struts 224 from the main frame. The side-guidance wheels 223 are mounted with their axles inclined but may be mounted on upright axles. Instead of using side-guidance wheels, the traction wheels 203 may be provided with flanges which extend downwardly so that the wheels 203 embrace the upper and side surfaces of the pipe 204; but this would mean that the hydrant platforms 220 would be unable to project sideways beyond the pipe.

Figure 3:
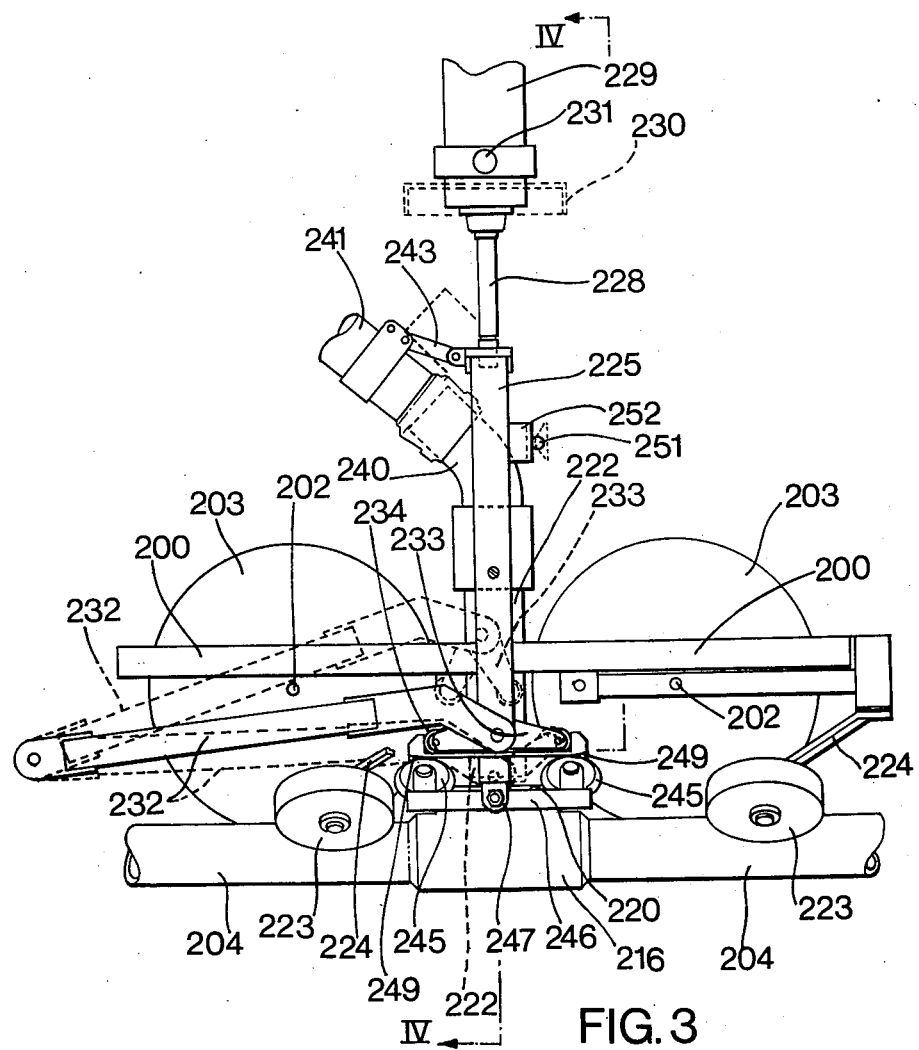
FIG. 3 is a side elevation of part of the machine shown in FIG. 1 drawn to a larger scale.
Figure 5:
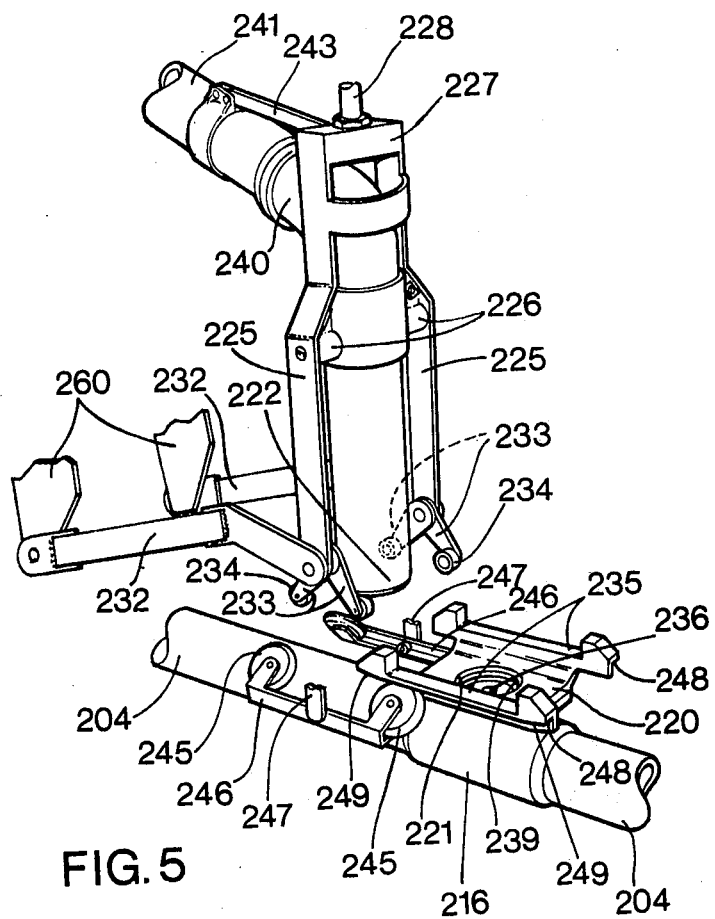
FIG. 5 is a diagrammatic perspective view showing hydrant-engaging parts of the machine in a position prior to engaging a hydrant.

The probe 222 is supported in a frame comprising a pair of upright side members 225 (see FIGS. 4 and 5) mounted one on each side of the probe 222 on transverse blocks 226 and 227 and carried by a plunger 228 of a pneumatic ram 229 for raising and lowering the probe 222. The ram is supported on a superstructure 230 carried by the main frame of the machine. The ram 229 together with the probe 222 and its supporting frame is mounted for swinging about a transverse pivot 231 with respect to the superstructure 230. The lower end of each side member 225 is pivotally attached to a link 232 pivotally mounted at its other end to a plate 260 carried by the main frame. As the probe ram 229 is actuated to raise and lower the probe 222, the links 232 will pivot between an extreme raised position shown in broken lines in FIG. 3, through the intermediate position shown in full lines in FIG. 3 to a lower position also indicated in broken lines in FIG. 3. During this movement the probe assembly will pivot about the pivot 231 and thus except when in its intermediate upright position, shown in full lines in FIG. 3, corresponding to the intermediate position of the links 232 it will deviate from the upright position.

The side members 225 each carry a pair of depending pivoted arms 233 which are provided with rollers 234 at their free ends. The rollers 234 are arranged to run in notches 235 provided in the upper edges of upstanding sides of the platform 220 as the probe assembly is raised and lowered. The notches 235 extend parallel to the longitudinal axis of the hydrant 216, that is they extend in the fore-and-aft direction of the pipe 204. The combined length of each pair of arms 233 when fully divergent is substantially equal to the length of each notch 235. The arms 233 are arranged to be fully divergent when the probe 222 has been lowered to the position shown in full lines in FIG. 3, that is just before the probe 222 enters the socket 221 in the hydrant platform 220. As will be explained hereinafter, the purpose of the pivoted arms 233 is to ensure that the probe 222 is precisely aligned vertically above the socket 221.

As shown in FIG. 4, the valve member 217 has an upwardly-extending stem 236. This is to be engaged by a pin 237 mounted by radial arms 238 within the probe 222, which is tubular, as the probe is lowered. The pin 237 is positioned a sufficient distance within the probe 222 to ensure that the lower end of the probe 222 will enter into the socket 221 and seal with an annular seal 239 before the pin 237 engages the top of the valve member stem 236 and opens the valve member 217 to permit water to flow upwardly into the probe 222 from the pipe 204. The probe 222 is connected by a pipe coupling 240 to an inclined pipe 241 which is slidable telescopically in tubular socket 242 leading to the water gun 207. The lower end of the pipe 241 is connected by a pivoted link 243 to the probe assembly to permit the pipe 241 to accommodate the upward and downward movement of the probe assembly and to ensure that the upper end of the pipe 241 slides telescopically in the socket 242.

The machine must be held downwardly on the pipe 204 before a hydrant is opened against the upward movement of the water. This is accomplished by providing at each side of the machine a pair of rollers 245 carried on a member 246 which is pivotally attached to an upright member 247 depending from the machine frame structure. The rollers 245 are arranged to engage under an inverted L-section rail 248 formed beneath the adjacent side edge of the hydrant platform 220 when the machine has been brought into the position of precise vertical alignment of the probe 222 with the socket 221. When the valve member 217 is opened, the water pressure will urge the probe upwards until the rollers 245 have been clamped against the respective rails 248. The machine is therefore held down firmly against the pipe 204. Upright structural members which support the upright members 247 also carry guidance rollers 250 which guide the probe frame members 225 in their upward and downward movement (see FIG. 4). The super-structure 230 also carries a roller 251 against which a thrust reaction pad 252 (see FIGS. 1 and 3) carried by the probe frame engages when the probe has been coupled to the hydrant. The purpose of the pad 252 is to absorb the water thrust horizontal component acting from left to right, as viewed in FIGS. 1 and 3, due to the inclined pipe 241.

The rams 212 and 229 are supplied by compressed air from a reservoir 254 (shown in FIG. 1) carried on the machine. The reservoir is charged by an i.c. engine-driven compressor 255 also mounted on the machine.

The operation of the machine is now described. It is assumed that the machine has been positioned with the traction wheels 203 resting on the upper surface of a pre-laid pipe 204, having self-closing hydrants 216 spaced apart along its length, and the side-guidance wheels 223 are positioned on each side of the pipe to maintain the traction wheels centrally of the pipe substantially above its longitudinal axis. The outrigged trailing wheels are also positioned one on each side of the pipe. The machine will have previously been stopped by a STOP control and so the probe 222 will be in the 'UP' position (i.e. the upper position shown by broken lines in FIG. 3). A START control is then operated to start the ram 212. This drives the traction wheels 203 and the machine will travel along the pipe to the first hydrant 216. After the leading traction wheel 203 has ridden over the hydrant and before the trailing traction wheel 203 reaches the hydrant, a trip valve operates to shut off the supply of compressed air to the ram 212 and to supply air to the probe ram 229 to move the probe assembly downward. A pneumatically-operated clutch (not shown) provided between the drive from the ram 212 and the traction wheels 203 is also disengaged. The machine has been stopped with the probe axis approximately over the axis of the socket 221 in the hydrant 216 and as the probe assembly descends, the rollers 234 carried by the arms 233 will engage in the respective notches 235. As the arms 233 diverge on continued downward movement of the probe assembly, the machine will be rolled backward or forward longitudinally of the pipe until the arms 233 have become fully opened. In this position the axis of the probe 222 will be vertically aligned with the axis of the socket 221 in the hydrant 216. During the movement of the machine into its approximately correct position and during the precise vertical alignment of the probe above the socket, the rollers 245 will move underneath the respective rails 248. The ends of the rails are outwardly flared both in the vertical and lateral directions as indicated at 249 to permit the rollers 245 to enter the rails. Continued downward movement of the probe assembly affects the entry of the probe 222 into the hydrant socket 221 and the opening of the valve member 217 by the pin 237. Water then flows upwardly through the probe and the pipe 241 to the water gun 207. The irrigation period is determined by a pre-set timer device which at the end of the pre-set time introduces compressed air to the ram 229 to raise the probe assembly. The probe is thus withdrawn and the valve member 217 substantially closes. When the probe assembly has reached its fully raised position a valve re-engages the clutch and starts the ram 212, which thereby drives the machine to the next hydrant. When the machine reaches the next hydrant, the sequence is repeated. The machine will therefore continue operating in this way until a trip stops the machine or until the STOP control is operated. Where the pipe is laid in a closed circuit, the irrigation can be continued indefinitely. Periodically, the reservoir 254 is recharged with compressed air by automatic operation of the compressor 255. Ultimately, the machine would have to be stopped to re-fuel the compressor engine. If any hydrants are to be omitted from the irrigation sequence, the stop trip associated with that hydrant would not be set.

Although the machine described with reference to FIGS. 1 to 5 is a complete irrigation machine, a similar machine with or without the trailing wheel assembly and the water gun 207 may be attached to a non-guided, driven or non-driven, wheeled irrigation machine such as a boom irrigator. In this way a non-guided machine such as a boom irrigator may be converted into a pipe-following machine. As the boom irrigator will probably be very heavy, the pipe-following part of the machine would be so arranged as to be moved, as hereinbefore described, into precise vertical alignment with the hydrant without corresponding movement of the boom irrigator. FIGS. 6 to 9 show an alternative pipe-following attachment to be used to guide a self-driven boom irrigator.

Figure 6:
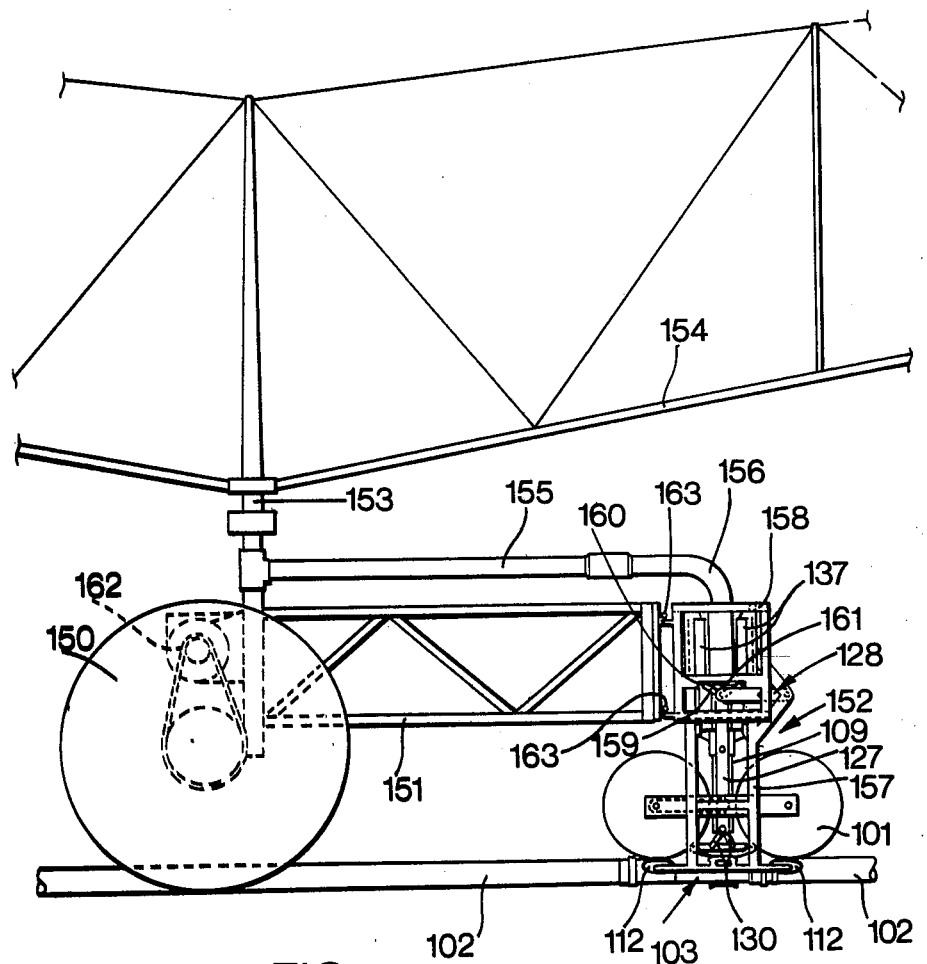
FIG. 6 is a side view of the second irrigation machine.

Referring to FIG. 6, the boom irrigator comprises a pair of ground-engaging wheels 150 suspended from a main frame 151. In a conventional machine of this type the frame 151 could also be supported by another pair of wheels or by a single castor wheel. However in accordance with the present invention, the additional pair of wheels or the castor wheel is replaced by a pipe-following and automatic hydrant-engaging means, indicated generally by arrow 152. The frame 151 supports an upright pipe 153 which acts as a pivot for the rotatable boom 154. This carries sprinklers or other discharge devices (not shown) in known manner. The pipe 153 could normally be connected to a water supply pipe or hydrant, but as the machine includes the pipe-following and hydrant-engaging means 152, the pipe 153 is connected by pipes 155 and 156 to a vertically movable riser pipe 109 which is automatically connectable in succession to hydrants spaced apart along the water supply pipe 102, which the complete irrigation machine is to follow.

The pipe 102 has a plurality of hydrants 103 spaced apart along it. Each hydrant (see particularly FIGS. 8 and 9) comprises a housing 104 containing a two-stage valve consisting of a first valve member 122 arranged to seat against a second valve member 119 which seats against an annular seat 120. The valve members are normally held closed by the combined action of water pressure under the valve members and by a spring 118. The valve members 122 and 119 are arranged to be opened by the lower end 126 of the riser pipe 109 descending and engaging a tubular valve-engaging plunger 124 which first engages and opens the valve member 122 and then the valve member 119. The riser pipe 109 is telescopically slidable with respect to an upright part of the pipe 156. The hydrant housing 104 is formed as a socket 108 in which the riser pipe 109 is insertable, sealing between the socket 108 and the riser pipe 109 being effected by a sealing ring 111 engaging the riser pipe. The upper surface of the hydrant housing 104 extends above the upper surface of the pipe 102 and is connected thereto by concave ramp-like surfaces 110.

The pipe-following and automatic hydrant-engaging means 152 comprises a first support structure constituted by frame 157 on which a pair of wheels 101 arranged in tandem are mounted. The wheels 101 are arranged to run on the upper surface of the pipe 102 and up and down ramps 110 on each hydrant housing 104. The frame 157 is located laterally to maintain the wheels 101 on the upper surface of the pipe 102 by pairs of side-guidance wheels 112 carried by the frame 157. The riser pipe 109 is mounted in the frame 157 for upward and downward movement and has a pair of substantially upright links 127 pivotally mounted thereon on trunnion-like pivots. Each link 127 is connected at its ends to links pivoted to the frame 157 to form a Watt-type linkage 128. The riser pipe 109 is raised and lowered by pneumatic cylinders 137 carried on the frame 157. The frame 157 is supported in a second support structure constituted by frame 158 which is attached to the main frame 151 of the irrigation machine by ball-and-socket joints 163 permitting articulation between the main machine frame 151 and said second frame 158 about a vertical axis. The frame 157 is mounted for movement within the frame 158 in directions fore-and-aft of the machine, that is longitudinally of the pipe 102. The extent of this movement of the frame 157 within the frame 158 is controlled by two pairs of divergent, pivoted arms 130 and 159 which carry rollers 131 and 160, respectively, at their outer ends. The rollers 131 are arranged to travel along tracks parallel with the longitudinal axis of the pipe 102 formed by recesses 132 formed in flanges 133 along the top of each side of the hydrant housing 104. The rollers 160 are similarly arranged to travel along tracks formed in recesses 161 parallel with the longitudinal axis of the pipe 102 in the frame 158. The lengths of the recesses 132 and 161 are substantially equal to the combined lengths of the arms 130 and 159 when fully divergent.

In use, the pipe-following and hydrant-engaging means 152, after connection to the main frame 151 of the irrigation machine, is arranged with the wheels 101 running on the upper surface of the pipe 102 and the side-guidance wheels 112 engaging the sides of the pipe. As the machine is driven along the ground, the wheels 101, together with the side-guidance wheels 112 will cause the machine to follow the course of the pipe 102. When the pipe-following and hydrant-engaging means 152 reaches the position of a hydrant, the leading wheel 101 will ride up and down the ramp-like surfaces 110 and the machine will be stopped with the pipe-following and hydrant-engaging means 152 in the position illustrated in FIG. 6. In this position, the riser pipe 109 will be substantially in vertical alignment with the hydrant socket 108. The riser pipe 109 is then lowered automatically as a result of a trip switch or the equivalent. As the riser pipe 109 is lowered towards the hydrant socket 108, the rollers 131 carried on the arms 130 enter the lower tracks formed by the recesses 132 in the hydrant housing 104 and the arms will diverge into the positions illustrated in FIG. 7, in which positions the rollers 131 engage the ends of the recess and so shift the frame 157 bodily in the frame 158 in the fore-and-aft direction to bring the riser pipe 109 into precise vertical alignment with the hydrant socket 108, the frame 158 and the remainder of the irrigation machine remaining stationary. The riser pipe 109 on being lowered further opens the hydrant valve members and the upthrust of the water pressure on the riser pipe effects locking of members 134 against the underneath of flanges 133 on each side of the hydrant housing. On the raising of the riser pipe 109 after irrigation has been carried out for a predetermined time, as may be determined by a time switch, the valve members are closed and the frame 157 is unlocked from the hydrant housing 104. The riser pipe 109 is then withdrawn from the hydrant socket 108 and the arms 130 pivot together and leave the recesses 132. During this movement, the upper arms 159 enter the recesses 161, as shown by broken lines in FIG. 2, and when the riser pipe 109 has been fully raised, the arms 159 will have diverged fully so that the rollers 160 engage the ends of the recesses 161. This effects shifting of the frame 157 and the riser pipe 109 in the fore-and-aft directions to centralize the frame 157 in the frame 158.

The irrigation machine may be driven along the water supply pipe 102 by driving the wheels 101 or it may be driven by a motor 162 mounted on the main machine frame 151 connected to drive the ground-engaging wheels 150, as illustrated in FIG. 6. The motor 162 may be a pneumatic or hydraulic actuator or turbine, an i.c. engine or an electric motor.

The sequence of operations of the pipe-following and hydrant-engaging means 152 is similar to that described in the case of the irrigation machine shown in FIGS. 1 to 5 except for the provision of the upper arms 159 engageable in the recesses 161, as described hereinbefore.

The Watt-type linkage used in the pipe-following and hydrant-engaging means 152 may be used instead of mounting the whole probe assembly about a horizontal pivot such as 231 shown in FIG. 1. Alternatively the mounting of the whole riser pipe assembly, similarly to the mounting of the whole probe assembly of FIGS. 1 to 5, may be employed in the pipe-following and hydrant-engaging means 152 of FIGS. 6 to 9.

Each irrigation machine described herein is intended to travel along a pipe in which the hydrants have probe-receiving sockets in-line with the longitudinal axis of the pipe. If it is preferred that the upper surface of the pipe is not interrupted by raised hydrant platforms, the hydrants could be offset laterally with respect to the pipe axis, in which case the probe assembly would also be offset laterally with respect to the traction wheels.

An advantage of each of the irrigation machines described hereinbefore is that the pipe itself provides a track on which the traction wheels run and so they could not be driven into soft ground where no special running track is provided, or a special running track for the traction wheels does not have to be provided. Despite this advantage, the irrigation machine could be arranged to run on the ground where spaced hydrants are connected by, for example, buried pipe and the machine is to be guided by a method other than pipe-following, for example by an electrical guidance system, such as a system employing a buried control cable. With such an arrangement, the side-guidance wheels 223 or 112 would not be required; but the machine would still be brought into precise vertical alignment with a hydrant by using, for example, the pivoted arms and rollers 233, 234 and the notch 235 of FIGS. 1 to 5 and holding the machine onto the hydrant by, for example, the rollers 245 engaging in rails 248 on the hydrant.

Although the traction wheels are driven by a pneumatic actuator and the probe is raised and lowered by a pneumatic ram in the machine described in FIGS. 1 to 5, other driving and probe raising means may be used, such as water-powered rams or a traction wheel driving turbine, i.c. engines or electric motors.

In either embodiment, the pipe may be formed from straight or curved sections and these may be rigid pipes or lengths of hose-pipe which may be flexible but sufficiently rigid to support the weight of the machine.

Although the irrigation machines illustrated have traction wheels running on the pipe, means equivalent to wheels, e.g. an endless track may be employed.

What I claim as my invention and desire to secure by Letters Patent of the United States is:

1. Irrigation apparatus comprising a water supply pipe extending over ground to be irrigated; a plurality of upwardly-facing hydrants spaced apart in the length of the pipe; a self-closing valve in each hydrant and an irrigation machine arranged to follow the pipe and to be coupled to the hydrants in succession, the machine comprising a vehicle; at least one traction wheel supporting said vehicle and running on an upwardly-facing surface of the pipe; a pair of side guidance devices carried by said vehicle and engaging opposed side surfaces of said pipe to maintain said traction wheel substantially centrally aligned on said upwardly-facing surface of said pipe; a vertically-movable riser pipe carried by said vehicle; a driving motor connected to said vehicle to drive said traction wheel to propel said vehicle along said pipe from one hydrant to another and to stop said vehicle with said riser pipe positioned substantially vertically above a hydrant; a hoist to raise and lower said riser pipe to couple the lower end of said riser pipe with a hydrant at which said vehicle has stopped; a track on each hydrant extending in the longitudinal direction of said pipe and having end walls spaced apart by a known distance; a locating device carried on said riser pipe and engageable in said track of the hydrant at which said vehicle has stopped prior to coupling said lower end of said riser pipe with said hydrant to shift said riser pipe to bring said riser pipe into precise vertical alignment with said hydrant before coupling of said riser pipe with said hydrant is effected; a valve-opening member on said riser pipe and operable to hold open the valve in said hydrant while said riser pipe is coupled with said hydrant; and co-operable clamping faces on said vehicle and said hydrant to hold the vehicle in the position of precise vertical alignment while water is flowing from said hydrant to said riser pipe.

2. Irrigation apparatus as claimed in claim 1 in which said locating device to shift the vehicle into said position of precise alignment comprises a pair of freely hinged links and a hinge interconnecting said hinged links and carried by said riser pipe, the lower ends of said hinged links being received in said track as the riser pipe is lowered towards the hydrant, the length of the track being substantially the same as the combined length of the hinged links when fully diverged, whereby as the riser pipe is lowered the free ends of the hinged links will engage the respective end walls of the track and thereby shift the hinge and thus shift said riser pipe to bring the riser pipe into pecise vertical alignment with the mouth of the hydrant.

3. Irrigation apparatus as claimed in claim 1 including a member carried by the vehicle and movable during said shifting of the vehicle into said position of precise alignment relatively to a co-operating fixed surface positioned on said hydrant above said member, whereby when water is discharged through the hydrant to the riser pipe an upward thrust of water on the riser pipe will engage said member with said fixed surface, said member and said fixed surface being said co-operable clamping faces.

4. Irrigation apparatus as claimed in claim 1 in which said pair of side guidance devices comprises at least one pair of sideways-locating wheels engageable with the side surfaces of the pipe.

5. Irrigation apparatus as claimed in claim 1 in which each said hydrant includes a housing containing said valve and provided with an upper surface positioned above said upwardly-facing surface of the pipe, and ramp-like surfaces interconnecting the upper surface of the housing to said upwardly-facing surface of the pipe.

6. Irrigation apparatus comprising a water supply pipe extending over ground to be irrigated; a plurality of upwardly-facing hydrants spaced apart in the length of the pipe; a self-closing valve in each hydrant and an irrigation machine arranged to follow the pipe and to be coupled to the hydrants in succession, the machine comprising a first vehicle, water distribution means carried by said first vehicle, a second vehicle to which said first vehicle is coupled, said second vehicle comprising a first support structure, at least one traction wheel supporting said first support structure and running on an upwardly-facing surface of said water supply pipe; a pair of sideways-locating wheels engageable with opposed side surfaces of said pipe to maintain said first support structure and said traction wheel substantially centrally disposed on said upwardly-facing surface of said pipe, a vertically-movable riser pipe carried by said first support structure; a driving motor mounted on said first vehicle to propel said first vehicle and hence to propel said second vehicle along said pipe from one hydrant to another and to stop said first vehicle and said second vehicle with said riser pipe positioned substantially vertically above a hydrant; a hoist mounted on said first support structure to raise and lower said riser pipe to couple the lower end of said riser pipe with a hydrant at which said second vehicle has been stopped; a second support structure mounted on said first vehicle, a coupling between said second support structure and said first support structure permitting shifting of said first support structure in the fore-and-aft direction of the machine and longitudinally of the water supply pipe relatively to said second support structure; a track on each hydrant extending in the longitudinal direction of said pipe and having end walls spaced apart by a known distance; a locating device carried on said riser pipe and engageable in said track of the hydrant at which said second vehicle has stopped prior to coupling of said lower end of said riser pipe with said hydrant and to abut said end walls of said track to shift said riser pipe to bring said riser pipe into precise vertical alignment with said hydrant before coupling of said riser pipe with said hydrant is effected; a valve opening member on said riser pipe and operable to hold open the valve in said hydrant while said riser pipe is coupled with said hydrant; and co-operable clamping faces on said second vehicle and said hydrant to hold said second vehicle in the position of precise vertical alignment while water is flowing from said hydrant to said riser pipe.

7. Irrigation apparatus as claimed in claim 6 including a ground-engaging traction device supporting said first vehicle coupled to said driving motor carried by said first vehicle, whereby the complete apparatus is propelled along the course of the pipe.

8. Irrigation apparatus as claimed in claim 6 in which said coupling between said second support structure and said first support structure comprises a further track on said second support structure and extending in the longitudinal direction of said pipe, said second track having end walls spaced apart by a known distance, a substantially upright member mounted on said riser pipe for pivoting about an axis transverse to the longitudinal axis of the riser pipe, a pair of pivotally-mounted divergent arms carried by said upright member at each end thereof and having their ends, remote from said substantially upright member, arranged to travel along said track and said further track respectively, each of said tracks having a length substantially the same as that of the combined length of the respective hinged arms when substantially fully diverged, whereby as the riser pipe is lowered, the free ends of the lower hinged arms will engage the ends of said track on said hydrant and shift said first support structure relatively to said second support structure to bring the riser pipe into precise vertical alignment with the mouth of the hydrant and when the riser pipe is raised, the free ends of the upper hinged arms will engage the ends of said further track on said second support structure and thereby shift said first support structure relatively to said second support structure to centralise said first support structure with respect to said second support structure in the fore-and-aft direction thereof.

* * * * *